July 15, 1941.  A. B. KEMPEL  2,249,428

BRAKE LINER FASTENING

Filed Nov. 24, 1939

Inventor,
A. B. Kempel,
By Robert M. Pierson,
Attorney

Patented July 15, 1941

2,249,428

UNITED STATES PATENT OFFICE 2,249,428

BRAKE LINER FASTENING

Arthur B. Kempel, East Brady, Pa., assignor to Rex-Hide, Incorporated, East Brady, Pa., a corporation of Pennsylvania Application November 24, 1939, Serial No. 305,879

4 Claims. (Cl. 188—234)

This invention relates to bolt fastenings for detachably securing a renewable part, such as a friction liner block or facing, upon a base such as a brake shoe for motor vehicles. Its principal object is to overcome the rather frequent cases of cracking of the bolt-hole walls through excessive clamping pressure of cone-headed bolts against the lining, which have heretofore occurred in renewing the linings.

Figure 1:
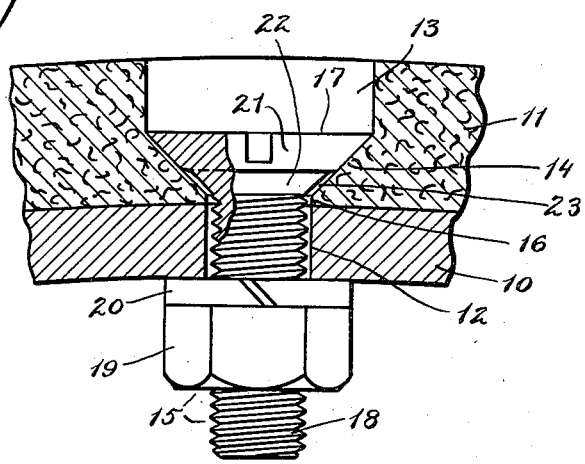

Of the accompanying drawing views, Fig. 1 is a longitudinal vertical section through one of the bolted joints of a brake shoe, showing a preferred form of my improved bolted fastening.

Figure 2:
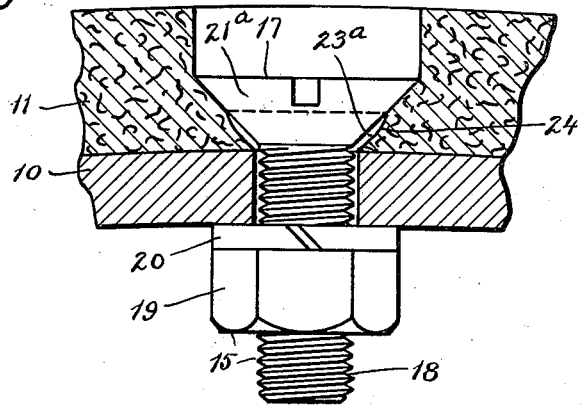

Fig. 2 is a similar view showing a modification.

In the drawing, 10 is a portion of a motor-vehicle brake shoe having detachably secured thereon a molded facing block 11 of friction composition of the relatively-thick, heavy-duty type employed on trucks and busses. The shoe is drilled with the usual bolt apertures 12, and in line therewith the liner block is formed with corresponding outwardly cylindrical apertures 13, each having a reduced conical bottom 14, for receiving the complemental head of an attaching bolt 15. The cone bottom terminates in a shallow mouth 16 of about the same diameter as the shoe bolt aperture. The mouth is thus surrounded by an annular wall of thin tapered or wedge section which cracks under an excessive clamping pressure of the conical bolt head when too strong a turning force is applied to the nut, as often happens. Such cracks weaken the bolted joint and may even cause a complete fracture of the liner block adjacent to the bolt hole.

The bolt 15 has a conical head 17 seated on the cone bottom 14, the usual screw stem 18 and nut 19 thereon, and a spring lock washer 20 interposed between the nut and the shoe body 10. In accordance with this preferred embodiment, the bolt head has an annular clamping face or band 21 of relatively reduced width, produced by annularly undercutting the usual flush face at 22, at the root or base of the head, adjacent to the stem 18. The seat 14 being of uniform conical shape, this leaves an annular, thin free space 23 between said seat and the lower zone of the conical head, where the liner material is relieved of clamping pressure, said pressure being then confined to the width of the band 17. It is found that, with brake linings of standard quality, this expedient completely cures the difficulty referred to, and the brass bolt stems can even be twisted apart or away from their heads, by the application of sufficient turning force to the nuts, without cracking the liner block.

In the Fig. 2 modification, the conical under face 21ª of the bolt head 17 is of uniform full depth without any undercut, but an annular clearance space 23ª is provided around the base of the head by grooving or relieving the liner block 11 as shown at 24 to confine the clamping pressure to a relatively narrow upper contact zone, equivalent to that of Fig. 1.

The particular embodiment of this invention may be otherwise modified, and the idea applied to the connection between a base and a frangible material other than molded brake lining which, as is well known, is usually composed of asbestos and mineral fillers including carbon black, held together with a hardened binder.

I claim:

1. A bolted fastening comprising a base, a frangible member thereon formed with a bolt aperture whose inner wall includes a substantially conical bolt-head seat, terminating in an inner mouth wall of tapered section, and a bolt through the base, having a screw stem with a nut thereon and a substantially conical head in said aperture, contacting with said seat only over a relatively-narrow outer marginal clamping zone and annularly spaced from the aperture wall in an inner clearance zone of substantial width around the root of said head, to relieve the mouth wall of clamping pressure.

2. A brake liner fastening comprising a brake shoe, a friction liner block thereon formed with a bolt aperture having a bottom wall, at least the upper portion of which is conical and a screw bolt through the shoe having a head with a conical outer margin in clamping contact with said upper portion of the bottom wall in a zone remote from the stem and separated from the mouth portion of said bottom wall by an inner annular clearance zone of substantial width around the root of the head.

3. A brake liner fastening according to claim 2 in which the conical base of the bolt head is undercut to provide the annular clearance zone referred to in claim 2.

4. A brake liner fastening according to claim 2 in which the bottom wall of the aperture is annularly grooved to provide the annular clearance zone referred to in claim 2.

ARTHUR B. KEMPEL.